July 29, 1952

C. A. HISSERICH ET AL 2,604,705

RADAR SIMULATOR

Filed March 27, 1946

*INVENTORS*
CHARLES A. HISSERICH
GEORGE A. BRETTELL JR.

BY

ATTORNEY

FIG. 4a

INVENTORS
CHARLES A. HISSERICH
GEORGE A. BRETTELL JR

FIG. 4b

INVENTORS
CHARLES A. HISSERICH
GEORGE A. BRETTELL JR.
BY
ATTORNEY

Patented July 29, 1952

2,604,705

UNITED STATES PATENT OFFICE 2,604,705

RADAR SIMULATOR

Charles A. Hisserich, Los Angeles, and George A. Brettell, Jr., San Diego, Calif., assignors to the United States of America as represented by the Secretary of the Navy Application March 27, 1946, Serial No. 657,388

8 Claims. (Cl. 35—10.4)

The present invention relates generally to electronic coincidence detectors and more particularly to such systems for detecting coincidence in two dimensions simultaneously. One useful application of the invention consists of the device described herein for giving instruction and practice to the operators of radio ranging equipment (radar).

In radio ranging equipment, a pulse is transmitted from a directional antenna and reflections of that pulse are received back and applied to apparatus for indicating both the presence of reflection and the time of its arrival. The target or other object so detected will lie in the direction from which the reflection is received and at a distance determined by the length of time for the radio signal to travel out to the target and back again. The operator of such equipment is able to search the complete field in a short time and he can read the range and bearing data rapidly enough to effectively keep track of several targets. Similar ranging operations are also carried out with sound transmissions under water.

In certain training apparatus wherein the tactical movements of several ships are simulated, it is desirable for purposes of realism to provide the same kind of problem data as would be available at sea and to provide it in the same manner.

It is an object of the present invention to provide apparatus for simulating the visual indications of radar and to provide it in a training device having a large number of freely-maneuverable simulated targets.

It is an object of the invention also to provide apparatus for simulating ranging signals and the reflections thereof from simulated targets and the like, and to provide a simple electronic device for duplicating the directional response and range indications of actual ranging devices.

It is a further object of the present invention to provide a simple electronic coincidence detector, and to provide one for detecting simultaneous coincidence in two dimensions.

In accordance with one manner of carrying out the invention, a radar transmission is simulated by a sweep of the beam of a cathode-ray tube across its screen, two points of which represent in plan the locations of a searching ship and its target. The beam is made to sweep out from one point in a radial search and an electrostatic pickup electrode is located at the other point to generate a signal pulse whenever the beam sweeps across it. The direction of the search, that is the direction of the sweep of the beam of the cathode-ray tube, indicates the bearing of the simulated target and the elapsed time between the beginning of the sweep and the generation of the voltage pulse at the pickup electrode indicates the range in simulation of actual radar operation.

In one specific embodiment of the invention, the sweep rate is constant, the pickup electrode is fixed, and the point from which the radial search is generated is moved about in accordance with the range and bearing of the simulated target. It is used with a standard radar control unit, which includes a saw-tooth sweep generator, and also cathode ray tubes for indicating ranges and positions of targets. The coincidence detecting tube receives radial-sweep voltage-components derived from this saw-tooth, and furnishes simulated target signals to the radar control unit.

This use of the sweep voltage of the radar control station makes the apparatus of the present invention a comparison system in which the sweep of the beam across the coincidence detecting scope is compared with that of the indicating scope at the control station. With such a system the sweep voltage need not be a saw-tooth because it is the deflections of the electron beams, and not times, that are compared.

Furthermore, the present system simulates radar signals from a large number of targets for a number of independently operated control stations at one time. Since the indications at the control stations are by means of cathode-ray tubes, the persistence of the images on the cathode-ray screens and the persistence of the operators' vision permit a large number of individual searches to be conducted in turn to provide what appear to the operators to be continuous pictures.

Preferably, a multiplexing system is employed so that a single detecting tube performs a number of distinct searches in succession. For example the coincidence detecting tube may serve a single control unit and search all targets in succession or may serve a single target and permit successive searches by different radar control stations.

These and other objects and advantages will be apparent from the following description. In the drawings.

Figures 1, 2:
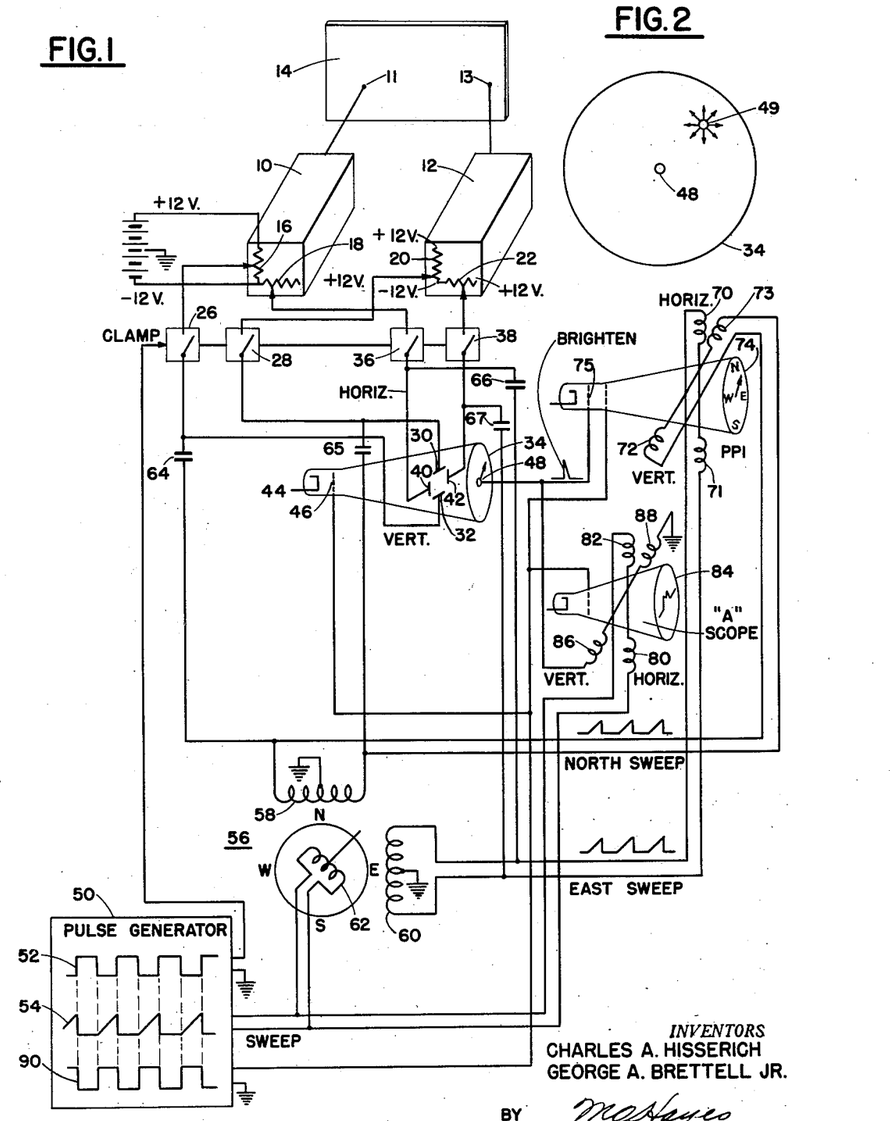
Fig. 1 is an electrical schematic diagram of one embodiment of the invention.
Fig. 2 is a diagram illustrating its operation.

Fig. 1 illustrates in abbreviated schematic form a system embodying the present invention. A pair of optical projectors 10 and 12 project spots of light 11 and 13 on the screen 14 to represent a searching ship and a target ship respectively, both maneuvering on an ocean. Projector 10 is equipped with a pair of potentiometers 16 and 18 the sliders of which move with the simulated ship 11 depicted by it. The slider of potentiometer 16 moves according to the north-south movements of the ship 11 and the slider of potentiometer 18 according to the east-west movements. Similarly a potentiometer 20 is operated by the north-south movements of the simulated ship 13 depicted by the projector 12 and a potentiometer 22 by the east-west movements. Direct current at 24 volts from a source 24 is applied to each potentiometer so that the north and east ends of the potentiometers are positive and the south and west ends negative. The center of the D.-C. source 24 is grounded.

Voltages from the two north-south potentiometers 16 and 20 are applied through electronic switches or clamps 26 and 28 to the vertical deflecting plates 30 and 32 of a cathode-ray tube 34, where they cause a vertical deflection of the spot on the screen proportional to their difference. Similarly the voltages from the sliders of the east-west potentiometers 18 and 22 are applied through electronic switches 36 and 38 to the horizontal deflecting plates 40 and 42 of the tube to produce a horizontal deflection proportional to their difference. The voltages so applied from the potentiometers 16, 18, 20 and 22 constitute positioning voltages. They move the cathode ray spot to a position on the screen of the cathode ray tube corresponding to the position of ship 13 relative to ship 11. Considered as a map of the ocean, the screen of tube 34 then has the searching ship 11 at its center and the target ship 13 at the position to which the spot has been deflected by the position voltages. The cathode-ray tube 34 includes also a cathode 44, a control grid 46 to which brightening and blanking signals can be applied and also a small pickup electrode 48 which lies at the center of the luminous screen of the tube, but outside the glass envelope.

A pulse generator 50 delivers three synchronized voltage waves for controlling the present system. A square wave 52 controls the four electronic switches, or so-called clamps, 26, 28, 33 and 36. During the positive half of each signal of the voltage wave 52, these clamps are made conducting to apply the positioning voltages from the potentiometers 16, 18, 20 and 22 to the deflecting plates of cathode-ray tube 34. During the negative half cycle of the voltage wave 52 these clamps are made non-conducting, to allow sweep-voltages to be applied through condensers 64, 65, 66 and 67. A saw-tooth voltage-wave 54 is applied to a control transformer 56 which consists of stationary secondary coils 58 and 60 lying at 90 degrees to each other, and a rotatable primary coil 62. The magnitudes of the voltages in secondary coils 58 and 60 are proportional to the cosine and sine respectively of the angle to which the primary coil 62 is set, which angle corresponds to the compass direction of the simulated radar search. These two voltages are, of course, in time-phase and so are suitable for controlling the horizontal and vertical deflections of a cathode-ray tube for producing a radial sweep, that is a sweep along a straight line whose direction is determined by the setting of coil 62. These two voltages are applied through condensers 64, 65, 66 and 67 to the deflecting plates 30, 32, 40 and 42 of the cathode-ray tube 34, but are so connected that the spot sweeps in the direction opposite to that indicated at coil 62. Thus in Fig. 1, coil 62 is set at bearing 030 and the sweep of tube 34 is in the opposite direction, that is, toward bearing 210.

The saw-tooth voltage wave 54 is flat and at a minimum value during the positive half of the wave 52 during which positioning voltages from potentiometers 16, 18, 20 and 22 are connected through clamps 26, 28, 36 and 38 to the deflecting plates of tubes 34, to position the spot according to the location of target ship 13 relative to ship 11. Then during the negative half of the wave 52, during which the clamps 26, 28, 36 and 38 are open, the condensers 64, 65, 66 and 67 retain the charges imposed by those positioning voltages and in effect add them to the saw-tooth sweep. Accordingly, the spot on the screen starts from the position determined by the positioning voltages and sweeps in a straight line in the direction opposite to that indicated by the setting of coil 62.

Referring to Fig. 2, consider the screen of the cathode-ray tube 34 as representing in part a map of the ocean on which the ships are maneuvering. The location of the searching ship 11 on the ocean corresponds to the position of electrode 48 at the center of the screen and the position of the target ship 13 corresponds to the position 49 to which the illuminated spot has been positioned by the positioning voltages from the potentiometers 16, 18, 20 and 22. The sweep voltages applied from transformer 56 then cause the spot to sweep away from point 49. If the setting of coil 62 is such that the spot sweeps from position 49 across the central pick-up electrode 48, a simulated target signal is produced. At this setting the angular indicator on coil 62 indicates the bearing of target position 49 from the pick-up electrode 48 which occupies the searching-ship position. It is because the searching sweep in the cathode-ray tube 34 is made from the target position 49 that the beam of this tube must sweep in the opposite direction to that indicated at the coil 62.

Refer again to Fig. 1. The tube 34 constitutes a part of the apparatus for simulating the search and is not viewed by the operator who is conducting the search. He is, however, provided with two indicating tubes 74 and 84, such as the indicators used in actual radar equipment.

Cathode-ray tube 74 is a plan-position indicator and its screen represents a map of the ocean. The cosine and sine sweep voltages from transformer windings 58 and 60 are applied to the deflecting coils 70, 71, 72 and 73 of this tube 74 to produce a sweep in the same direction as that indicated by the setting of coil 62. No positioning voltages are applied so that the sweep of tube 74 always starts from the center of the screen (which position corresponds to the position of the searching ship 11) and sweeps out in the direction of the simulated search to provide the operator with a continuous picture of the search operation. Since the operator cannot view tube 34 and therefore cannot know the actual location of the simulated target ship 13, he will rotate coil 62 to produce repeated sweeps in various directions. Some one direction will be found in which the beam of tube 34 will intercept pick-up electrode 48 to generate a voltage pulse or target signal. This voltage pulse is applied to a brightening electrode 75 of the tube 74 to produce a bright spot on its screen at the instant that the beam of tube 34 crosses the electrode 48. This bright spot on the face of tube 74 will lie in a direction from the center of the screen corresponding to the bearing of the simulated target 13 and at a distance from the center corresponding to its range. It thus indicates to the operator, as on a map, the location of the target with reference to his own ship (the searching ship).

The sweep voltage 54 is also applied directly to the horizontal deflecting coils 80 and 82 of the oscilloscope 84 to produce a horizontal trace in time with the sweep voltage. The pulse from the pick-up electrode 48 is applied to the vertical coils 86 and 88 to produce a "pip" in the trace. This tube is employed for providing accurate indications of range.

A square wave voltage 90 also obtained from the generator 50 has opposite phase from the voltage 52 to apply brightening voltages to all three cathode-ray tubes during the half cycle that the cathode-ray tubes make their sweeps and to blank them out during the other half cycle.

Figure 3A:
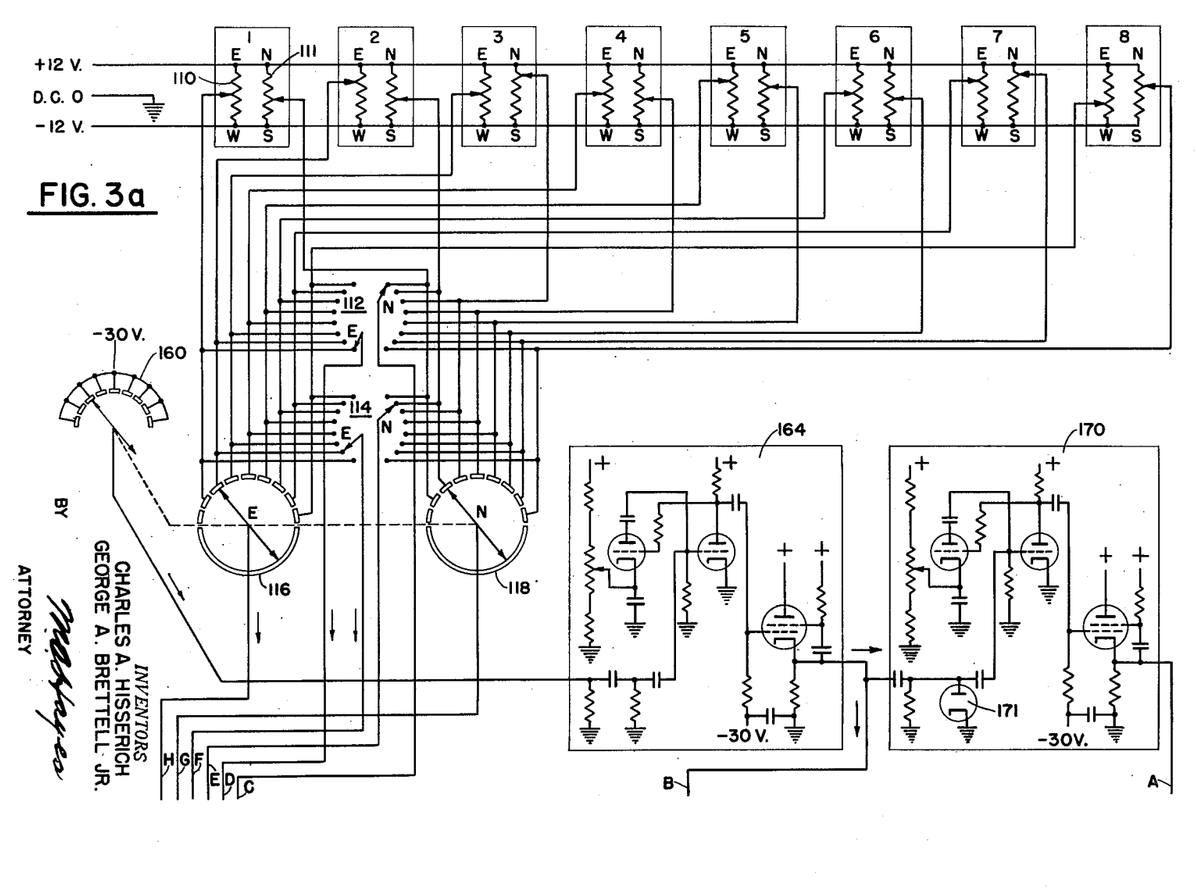
Fig. 3 is an electric schematic diagram of another embodiment.
Figure 3B:
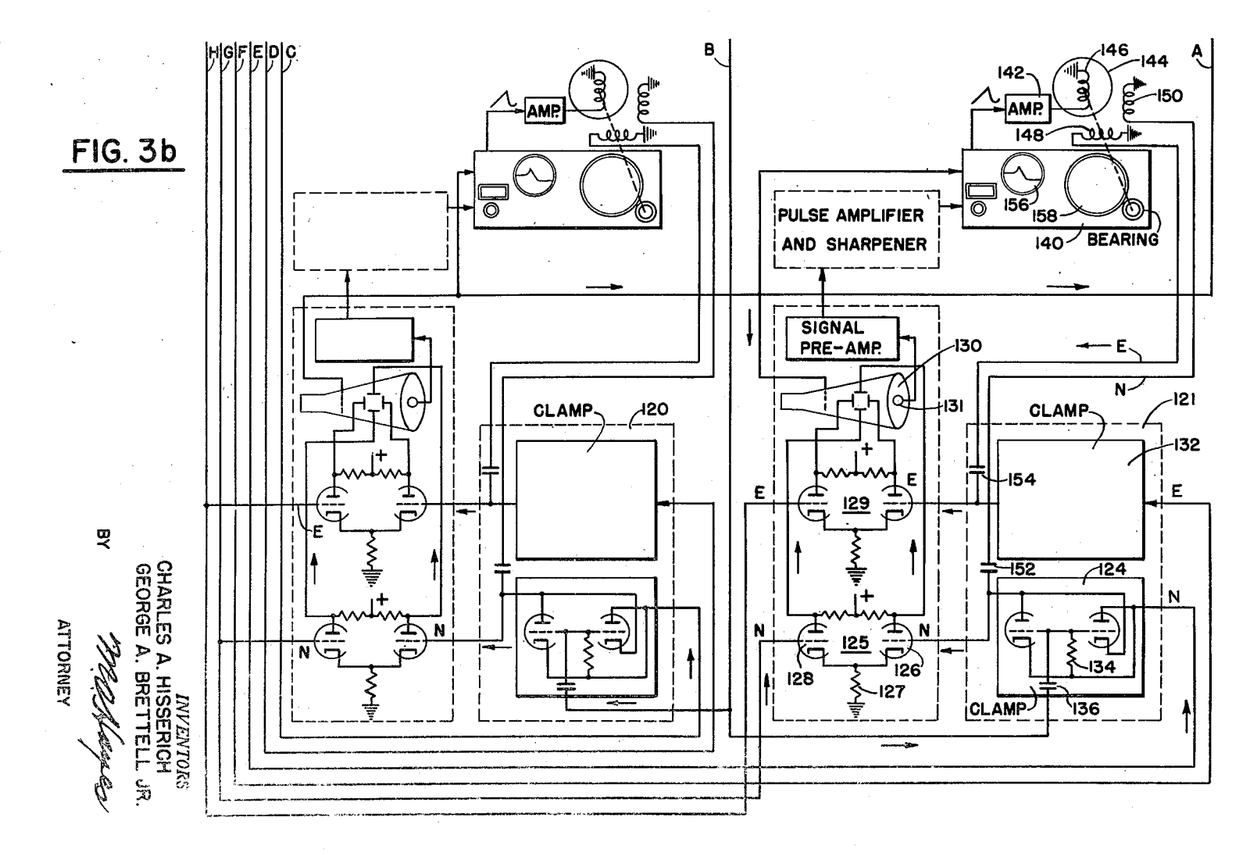

Fig. 3 shows a system involving 8 simulated ships and 2 radar search units. Ship projectors 1 to 8 inclusive have potentiometers 110, 111, etc., the voltage outputs of which indicate the north and east distance components of the ship from a convenient reference position such as the center of a projection screen. The outputs or positioning voltages from these potentiometers on all 8 targets are brought to a pair of radar assignment switches 112 and 114, and also to a pair of rotary target switches 116 and 118. Switch 112 selects the two position voltages from the potentiometers of any one of the 8 targets and conducts them to a clamping amplifier 120 which constitutes part of a radar control station. Switch 114 similarly conducts the voltages from some one ship to a clamping amplifier 121 which forms part of a separate and similar radar control station. The switches 116 and 118 are motor driven at about 1800 R. P. M. to conduct the positioning voltages from each ship in turn to both radar control stations to provide indications of target location. Thus switches 112 and 114 determine which ships are radar equipped so as to constitute search ships, and switches 116 and 118 scan the targets which are those ships remaining after the search ships are selected.

The north positioning voltage from switch 114 is applied through electronic clamp 124 to the grid 126 of one tube of a differential amplifier 125 and the north position voltage of the target from switch 118 is applied directly to the grid 128 of the other tube of this same differential amplifier. The output of this amplifier responds only to the difference in the two voltages applied to the grids 126 and 128 because if, for example, the voltages of both grids are raised, the output voltages from these plates will change by the same amount so that the voltage between the plates will show no change. Furthermore, this amplifier is balanced in that an increase in the voltage at one plate is always accompanied by a substantially equal decrease in voltage at the other plate. For example, with the potential of the grid 126 fixed, a rise in voltage of the grid 128 increases the current in the lefthand tube thereby increasing the drop in the cathode resistor 127 which is common to the two tubes. This increased drop in the cathode resistor reduces the grid-to-cathode voltage in the righthand tube and so reduces the current there. This balanced differential output is applied to the vertical, or north-south deflecting plates of a cathode-ray tube 130 which constitutes a coincidence detector, just as does the tube 34 in Fig. 1. The east positioning voltages for own ship and the target are applied similarly through a clamp 132 to a second differential amplifier 129 whose output drives the horizontal deflecting plates of the same cathode-ray tube 130.

Clamp 124 is shown in detail. It consists of two triodes, one of which provides a conducting path from plate to cathode in one direction and the other a similar path in the other direction for the positioning voltage from switch 114. The two grids are tied together and connected through a resistor 134 to one of the cathodes so that normally both tubes present a high resistance to the circuit. Under this condition the clamp is said to be open. When a positive voltage is applied to these grids through a condenser 136, both tubes exhibit low resistance and under this condition the clamp is said to be closed. The manner in which this so-called clamping voltage is applied will be described presently.

Included at the radar control station is a radar indicating and control unit 140 which includes a saw-tooth sweep generator. The saw-tooth output of this generator is applied to an amplifier 142 and thence to the rotor coil 146 of a control transformer 144 which includes also a pair of output coils 148 and 150. The rotor 146 is driven mechanically from the bearing control of the radar unit 140 so that the coils 148 and 150 receive saw-tooth voltages which are respectively cosine and sine functions of the bearing angle. These voltages are accordingly suitable for producing a radial sweep on a cathode-ray tube and are fed through condensers 152 and 154 to the own-ship input of the differential amplifiers 125 and 129 for tube 130.

The output from the tube 130 consists of a pulse generated by the passage of the cathode-ray beam across the electrode 131 in the center of the screen. This pulse is amplified and sharpened, and applied to the video input circuit of the radar control unit 140 for providing the simulation of radar echoes.

The control unit 140 is adapted to respond to a square wave signal for initiating its operation. This signal initiates the generation of the saw-tooth sweep voltage and makes that voltage produce traces on the two viewing tubes 156 and 158 which constitute a part of the control unit. Driven with the two target switches 116 and 118 is a pulsing switch 160. Each time that the switches 116 and 118 pass to a new segment so as to connect a different target, the switch 160 closes shortly thereafter to apply a keying pulse to a servile multivibrator 164 which immediately generates a square wave, the onset of which occurs at substantially the same time that the switch 160 closes. The duration of this square wave is determined by the operation of the multivibrator 164 and is approximately 90 microseconds. This square wave is applied to the clamps of the two clamp amplifiers 120 and 121 to make them conducting to thereby apply the own-ship positioning voltages to the differential amplifiers, and incidentally charge the condensers such as 152 and 154. This square wave from multivibrator 164 is also applied to a second servile multivibrator or square wave generator 170. Here the onset of the square wave voltage from 164 is shorted out by a diode 171 to insure that the multivibrator 170 will be triggered only by the negative swing or trailing edge of the square output from 164. Generator 170 therefore puts out a square wave which begins at substantially the same time that the clamping voltage is removed to close the various clamps such as 124. This square wave voltage from 170 is applied to the two radar control units 140 etc. to initiate the generation of the sweep voltage. It is also applied to the coincidence tubes 130 etc. for brightening the trace. If the beam of either coincidence tube sweeps across the central electrode it transmits a video signal to its associated control unit for simulating normal target signals on the indicating scopes.

Obviously the two rotary switches 116 and 118 must keep a single target connected long enough for the sweep to be completed. If operating at approximately 1800 R. P. M. with 8 targets to be scanned in each half revolution the targets will be scanned at the rate of 240 per second. Obviously only one searching sweep will be made on each target because each such sweep has to be initiated by the closing of switch 160 which is driven in step with switches 116 and 118. Obviously the search is made only in the direction set by the bearing control on the control unit. For example, it is the setting of the bearing control on unit 140 that determines the relative magnitudes of the sweep voltages applied to the north and east deflecting plates of the scope 130 and that therefore determines the direction of the search. The apparatus searches on this bearing for each of the 8 targets in succession (including the operator's own ship) and so gives an indication on that bearing if any one target lies there. Since all targets are searched each .03 second it is unlikely that any will be missed should the operator continually rotate the bearing control.

Figure 4A:
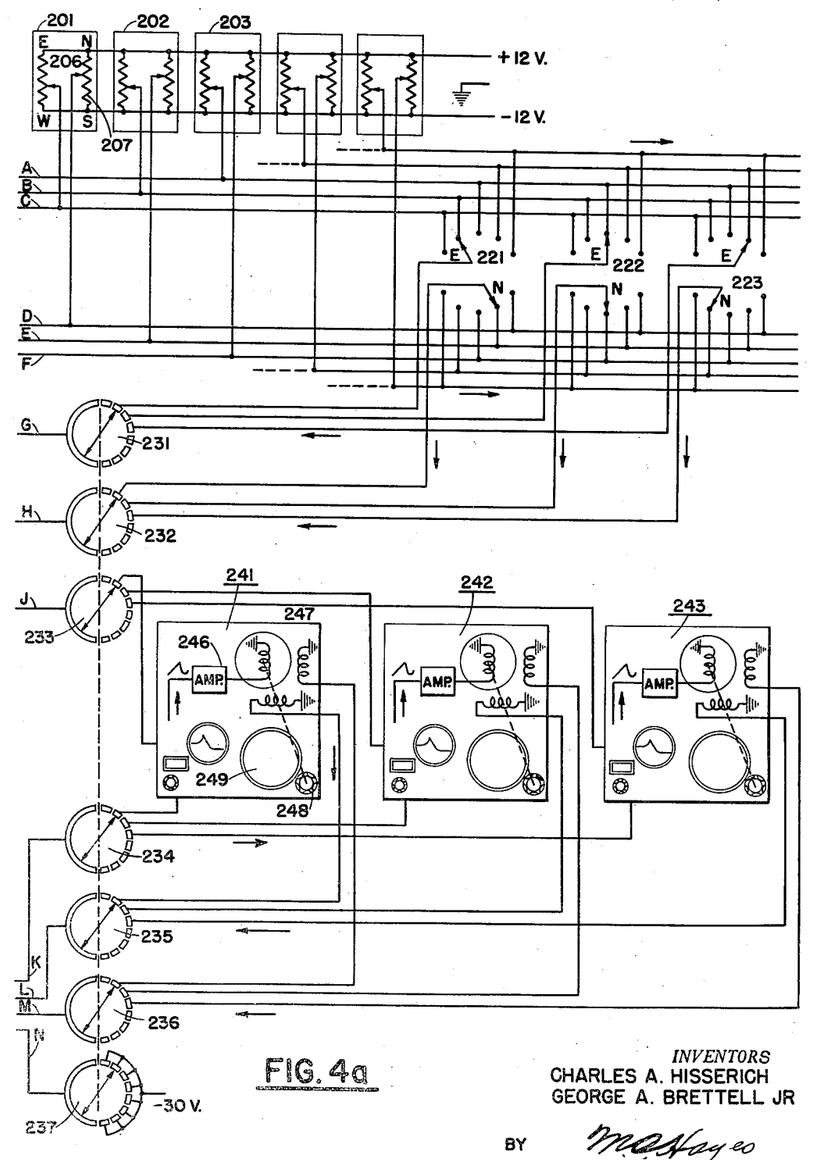
Fig. 4 is an electric schematic of still another embodiment thereof.
Figure 4B:
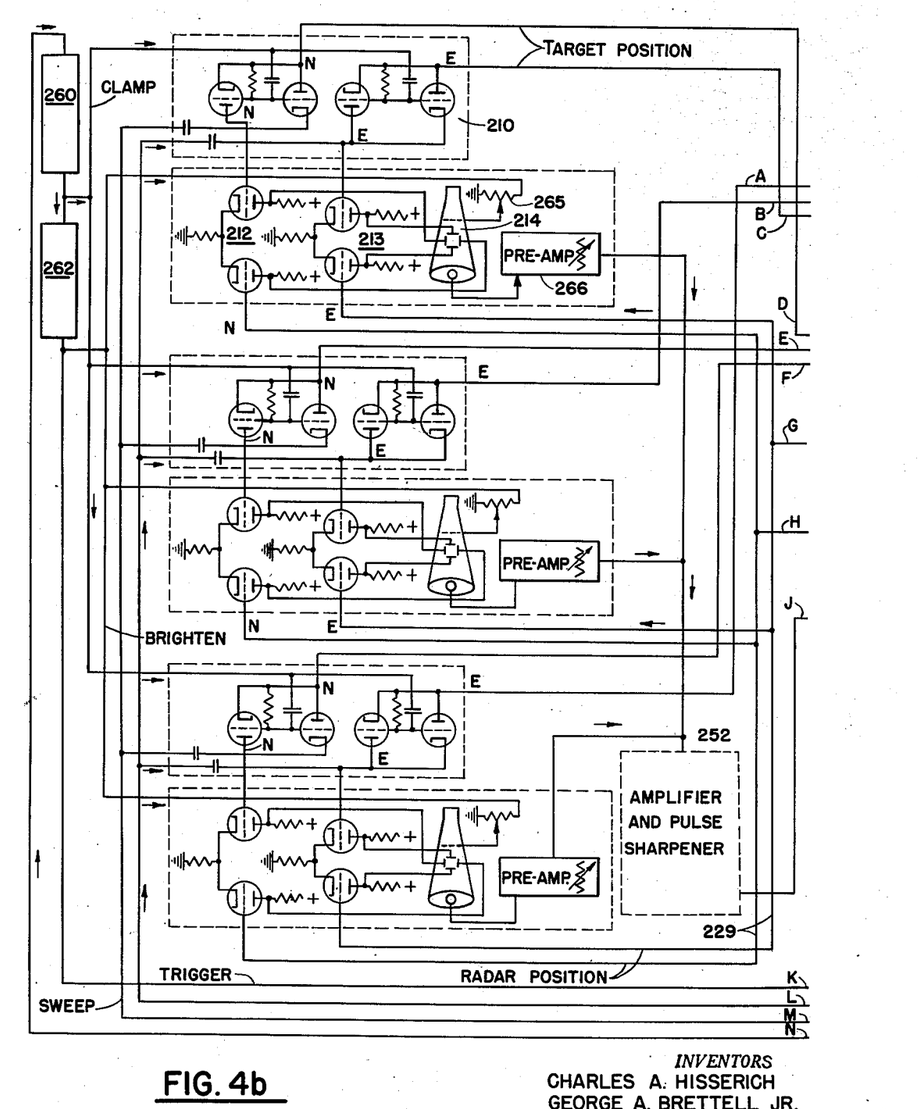

Fig. 4 illustrates a system differing from that of Fig. 3 in that a separate cathode-ray coincidence-detector is associated with each target ship rather than with each radar unit. In the system of Fig. 3 all search units were connected simultaneously to each target in turn. In Fig. 4 all targets as a group are connected to each search unit in turn.

Ship projectors 201, 202 and 203 etc. have potentiometers 206, 207 etc. for providing coordinate voltages or position voltages that indicate the locations of the respective ships. The position voltages from projector 201 are conducted through a clamping amplifier 210 to the control amplifiers 212 and 213 for a cathode-ray tube 214. Positioning voltages from the other projectors go to other similar clamping amplifiers and coincidence-detecting cathode-ray tubes (of which only three are shown). Positioning voltages from these ship potentiometers also go to selector switches 221, 222 and 223 for selecting the particular ships that separate radar units are to be associated with in the same manner as was done in Fig. 3. The outputs of these switches are connected to the contacts of a pair of rotary switches 231 and 232 which select positioning voltages from each of the switches 221 etc. in turn and connect them through wires 229 to the amplifiers for all the cathode-ray coincidence tubes. Each of the selector switches 221 etc. is associated with a separate one of the radar control stations 241, 242 and 243 which are similar in all respects to the radar control stations shown in Fig. 3. Thus the station 241 includes a saw-tooth generator, an amplifier 246 and a control transformer 247 for providing sweep voltages for the cathode-ray tubes controlled by the bearing control knob 248 and includes also indicators 249 responsive to target signals. The target signals from all the coincidence-detecting cathode-ray tubes are fed to an amplifier and pulse sharpening filter 252 and are distributed by the rotary switch 233 to the several radar control units 241 etc. Rotary switches 235 and 236 select the sweep voltages from each radar unit in turn and conduct them to the sweep amplifiers. For example, sweep voltages are connected at the output of clamping amplifier 210 so as to be applied to the sweep amplifiers 212 and 213 through the same control grids that receive the positioning voltage from the projectors 201 to which that amplifier is permanently associated.

As in the system of Fig. 3 a rotary switch 237 initiates the timing pulses for actuating a servile multivibrator 260, the output of which controls the clamping amplifiers and also a second servile multivibrator 262. The output of 262 begins at the end of the square wave from 260 and provides brightening pulses for the coincidence-detecting cathode-ray tubes 214 etc., and also triggering pulses which are distributed through rotary switch 234 to the various radar control units. These trigger impulses start the generation of the saw-tooth sweep voltages and initiate the operation of the indicators 249 etc. just as in Fig. 3.

The rotary switches 231 to 236 operate in substantial synchronism (as for example at 1800 R. P. M.) so that the circuits for the positioning voltages, target signal, triggering voltage, and sweep voltages, are completed for one radar control station at a time to all the coincidence-detectors, so that that one control station in performing a search can receive a target signal from any or all coincidence-detectors. Accordingly, that one control station searches all targets at once. As in Fig. 3, the contacts of timing switch 237 close shortly after the others to initiate the clamping and sweep operations.

The system of Fig. 4 requires less equipment than that of Fig. 3 in installations having more radar search units than targets, as for example where each ship in the problem is equipped with a number of radar units. The system of Fig. 4 has as a further advantage that the intensities of the target signals from each target may be separately controlled to simulate the difference between large and small targets and to simulate the gradual disappearance or sinking of a target. Thus the intensity of the target pulse from cathode-ray 214 may be controlled by potentiometer 265 which regulates the magnitude of the brightening voltage applied to tube 214. Alternatively, it may be controlled by an attenuator 266 in the pre-amplifier for the signal from tube 214.

The present invention is capable of numerous modifications and variations, limited only by the scope of the claims.

We claim:

1. In combination, two pairs of potentiometers for developing two pairs of positioning voltages, a cathode-ray tube, two push-pull amplifiers for controlling the two component deflections of the beam of said cathode-ray tube, switching means for connecting one of the two positioning voltages from one pair of potentiometers to one input side of one of said push-pull amplifiers, for connecting the other one of the two positioning voltages from said pair of potentiometers to one input side of the other push-pull amplifier and for connecting the two positioning voltages from the other pair of potentiometers to the other input sides of said two push-pull amplifiers, means for applying sweep signals intermittently to input terminals of said push-pull amplifiers, means synchronized with said sweep signals for opening said switching means during the application of said sweep signals, and output means selectively responsive to the sweep of the beam of said cathode-ray tube.

2. In combination, means for simulating the location of an object, a cathode-ray tube associated therewith having pickup means for generating a pulse in response to a sweep of the beam of the cathode-ray tube across it, means for simulating the locations of a plurality of other objects, means for developing sets of coordinate voltages corresponding to the position coordinates of said other objects relative to the first object, switch means for applying each set of said coordinate voltages in turn to said cathode-ray tube for positioning the electron beam thereof, and means for also applying sweep voltages to said cathode-ray tube for causing its beam to sweep.

3. In a training device, the combination with a radar control station having a sweep generator for generating a pair of synchronized voltages suitable for providing successive straight line sweeps on a cathode-ray tube, means for varying said sweep voltages suitably for varying the direction of the sweep of such a cathode-ray tube, lock-in means responsive to an externally applied pulse for synchronizing said sweep voltages therewith, and indicating means responsive to a target signal, of, a cathode-ray tube having a pick-up electrode for generating a simulated target signal in response to the sweep of the beam of the tube across said electrode, means for applying such simulated target signal to the indicating means of said radar control station, means for applying the sweep voltages of said radar control station to said cathode-ray tube for producing a sweep of the beam, means for simulating a plurality of ships including a radar-equipped searching ship, means associated with each simulated ship for generating voltages which constitute coordinates of the position of said ship, switching and control means for applying coordinate-difference voltages of a series of pairs of said ships in succession to said cathode-ray tube for displacing the trace of the beam, each individual pair of ships of said series including said simulated searching ship, said coordinate-difference voltages of a pair of ships consisting of the differences between the respective coordinate voltages of the ships of said pair whereby to constitute the coordinates of the position of one with respect to the other, and means for generating a synchronizing pulse in step with the operation of said switching and control means and for applying it to said lock-in means of said radar control station.

4. In a training device, the combination with a plurality of radar control stations each having a sweep generator for generating a pair of synchronized voltages suitable for providing a straight line sweep on a cathode-ray tube, means for varying said sweep components suitably for varying the direction of the sweep of such a cathode-ray tube, and indicating means responsive to a target signal, of, means for simulating a plurality of targets, a coincidence-detecting cathode-ray tube associated with each simulated target, each such cathode-ray tube having pickup means for generating a simulated target signal in response to the sweep of the beam of the tube across said pickup means, control connections for applying the sweep voltages from a single radar control station to all said cathode-ray tubes, control connections for so deflecting the beam of each cathode-ray tube that it begins its sweep at a position relative to the location of said pickup means which corresponds to the presumed position of said single radar relative to the simulated target associated with said cathode-ray tube, control connections for conducting the simulated target signals from all said cathode-ray tubes to the indicating means of said single radar control station, and switching means for transferring all said control connections from one of said radar control stations to another.

5. In combination in a training device, a group of simulated search apparatuses, each member of said group having a control station which includes means for generating sweep voltages suitable for controlling radial sweeps of the beam of a cathode-ray tube and also indicating means responsive to a target signal, a group of simulated target objects, means for developing coordinate voltages for defining the locations of all members of both said groups, control connections for each member of both said groups, said control connections for each search apparatus including those for sweep voltages, position voltages, and target signal, said control connections for each target object including those for position voltages, a coincidence-detector for each member of one of said groups, each such detector including a cathode-ray tube having a pickup means for generating a target signal in response to the sweep of the electron beam across a pre-determined part of the cathode-ray tube, control means for each cathode-ray tube for deflecting its beam in accordance with the differences of two sets of coordinate voltages so that it deflects in accordance with the position defined by one set relative to the position defined by the other, said control means for each cathode-ray tube serving also to superimpose sweep-voltages applied to said cathode-ray tube upon said differences of the coordinate voltages, said control connections for the members of said one group being fixed, switching means for applying said control connections for the members of the other group to each such member in succession.

6. The combination of claim 5, wherein there is included timing means controlled by said switching means for controlling the application of positioning voltages from the members of said other group to the cathode-ray tubes, and for controlling also the application of said sweep voltages thereto.

7. In a training device, the combination of a radar control station having a periodic voltage generator and a cathode ray indicator, adjustable rotary means for resolving the periodic voltage from said periodic voltage generator into two sweep voltages varying as the sine and cosine of the angular position of said adjustable rotary means, coordinate means for producing a plurality of first deflection voltages each representing a rectangular coordinate of a simulated target, means for producing second deflection voltages representing an assumed position of said radar control station, a cathode ray tube, deflection means associated with said cathode ray tube, amplifier means connected to said coordinate means for impressing on said deflection means difference voltages proportional to the difference between corresponding coordinates of one of said first deflection voltages and said second deflection voltages, means connecting said adjustable rotary means to said amplifier means for superimposing corresponding sweep voltages on said difference voltages, switching means for sequentially impressing said first deflection voltages on said amplifier means, whereby the electron beam of said cathode ray tube is deflected to the simulated positions of sequential simulated targets and swept in a direction controlled by said adjustable rotary means, a pickup electrode on said cathode ray tube responsive to impingement thereon of the electron beam of said cathode ray tube to produce a simulated target signal, and means for impressing said periodic voltage and said simulated target signals on the cathode ray indicator of the radar control station.

8. In a training device for simulating a plurality of searching ships and a plurality of simulated target ships, simulated ranging equipment for simulating the act of ranging on all other ships including the remaining searching ships for each searching ship comprising, a cathode ray tube, angularly adjustable means for applying linear radial sweep voltages to said cathode ray tube to deflect the electron beam thereof in a direction determined by the angular position of said angularly adjustable means, means for detecting impingement of said beam on a predetermined point on the screen of said cathode ray tube, means associated with each simulated ship for delivering coordinate voltages each representing respective rectangular coordinates of the associated ship, amplifier means connected to said cathode ray tube, means connecting the coordinate voltages of the associated searching ship to said amplifier, switch means sequentially connecting the coordinate voltages of the remaining ships to said amplifier, said amplifier being responsive to the difference between coordinate voltages representing the location of the searching ship and one of the remaining ships to displace the beam of said cathode ray tube to positions representing the difference between the coordinates of the simulated search ship and sequential remaining ships, whereby deflection of the beam across said predetermined point of the screen of said cathode ray tube indicates the relative range and direction from the searching ship to another simulated ship.

CHARLES A. HISSERICH.
GEORGE A. BRETTELL, Jr.

REFERENCES CITED

The following references are of record in the file of this patent:

UNITED STATES PATENTS

| Number | Name | Date |
|---|---|---|
| 2,399,661 | Bowie | May 7, 1946 |
| 2,404,387 | Lovell | July 23, 1946 |
| 2,405,239 | Seeley | Aug. 6, 1946 |
| 2,405,591 | Mason | Aug. 13, 1946 |
| 2,406,751 | Emerson | Sept. 13, 1946 |
| 2,415,190 | Rajchman | Feb. 4, 1947 |
| 2,426,218 | Hopgood | Aug. 26, 1947 |
| 2,438,888 | Andrews | Apr. 6, 1948 |